US010956965B1

(12) United States Patent
Castellano et al.

(10) Patent No.: US 10,956,965 B1
(45) Date of Patent: Mar. 23, 2021

(54) PROVIDING WEBPAGES USED TO CONFIGURE INTERACTIVE MARKETING PRESENTATIONS OVER A NETWORK

(71) Applicant: engajer, Inc., Menlo Park, CA (US)

(72) Inventors: Michael Christopher Castellano, Mountain View, CA (US); Shruthi Narasimha Murthy, Sunnyvale, CA (US); Richard Amrith Lourdu, San Jose, CA (US)

(73) Assignee: Engajer, Inc., West Palm Beach, FL (US)

( * ) Notice: Subject to any disclaimer, the term of this patent is extended or adjusted under 35 U.S.C. 154(b) by 399 days.

(21) Appl. No.: 15/424,763

(22) Filed: Feb. 3, 2017

Related U.S. Application Data

(63) Continuation of application No. 14/164,085, filed on Jan. 24, 2014, now abandoned.
(Continued)

(51) Int. Cl.
*G06Q 30/02* (2012.01)
*G06Q 30/06* (2012.01)
(Continued)

(52) U.S. Cl.
CPC ......... *G06Q 30/0641* (2013.01); *G06F 16/22* (2019.01); *H04L 67/02* (2013.01); *G06F 3/0482* (2013.01)

(58) Field of Classification Search
CPC .................................................... G06Q 30/02
(Continued)

(56) References Cited

U.S. PATENT DOCUMENTS

| 8,595,046 | B1 * | 11/2013 | Christian | G06Q 10/1095 705/7.18 |
| 2011/0246294 | A1 * | 10/2011 | Robb | G06Q 30/0254 705/14.52 |
| 2013/0073473 | A1 * | 3/2013 | Heath | G06Q 30/06 705/319 |

FOREIGN PATENT DOCUMENTS

| WO | WO 00/42593 | * | 7/2000 | G09F 27/00 |

OTHER PUBLICATIONS

Francisco Vega; Jose Medina; Victor Saquicela; Kenneth Palacio-Baus; Mauricio Espinosa, Towards a multi-screen interactive ad delivery platform (English), 2017 XLIII Latin American Computer Conference (CLEI) (pp. 1-10, Sep. 1, 2017 (Year: 2017).*

(Continued)

*Primary Examiner* — Marilyn G Macasiano
(74) *Attorney, Agent, or Firm* — Imperium Patent Works LLP; Amir V. Adibi; T. Lester Wallace

(57) ABSTRACT

A software application running on a server provides a webpage to an browser of a selling entity. The webpage includes an amount of instructions that renders User Interface (UI) components on the browser. The selling entity uses the UI components to configure an Interactive Marketing Presentation (IMP). The selling entity configures each segment of the IMP to include rich-media content (text, video, audio, and images). Configuration information of the configured IMP is communicated from the webpage to the software application via the network. The software application stores the configuration information in a database. A purchasing entity may then view the interactive marketing presentation by visiting a URL provided by the selling entity that causes the software application to retrieve the configuration information from the database, and to generate and supply a set of instructions that render the IMP using the (Continued)

SELLING ENTITY LOGS INTO THE IMS configuration information onto the browser of the purchasing entity.

22 Claims, 7 Drawing Sheets

Related U.S. Application Data

(60) Provisional application No. 61/757,060, filed on Jan. 25, 2013.

(51) Int. Cl.
　　*H04L 29/08*　　　(2006.01)
　　*G06F 16/22*　　　(2019.01)
　　*G06F 3/0482*　　(2013.01)

(58) Field of Classification Search
　　USPC ...................................................... 705/14.52
　　See application file for complete search history.

(56) References Cited

OTHER PUBLICATIONS

Tsung-Chih Hsiao; Carol Han; Xiaoguang Yu, The development and research of digital marketing in the contemporary society (English), 2016 International Coference on Applied System Innovation (ICASI) (pp. 1-4, May 1, 2016 (Year: 2016).*

* cited by examiner

SELLING ENTITY LOGS INTO THE IMS

SELLING ENTITY CONFIGURES INTERACTIVE MARKETING
PRESENTATION (IMP) USING UI COMPONENTS

SELLING ENTITY CONFIGURES SEGMENTS
OF THE IMP TO INCLUDE VIDEO

CONFIGURATION INFORMATION OF IMP IS RECEIVED ON SOFTWARE APPLICATION AND STORED IN DATABASE

PROVIDING WEBPAGES USED TO CONFIGURE INTERACTIVE MARKETING PRESENTATIONS OVER A NETWORK

CROSS REFERENCE TO RELATED APPLICATIONS

This application is a continuation of, and claims priority under 35 U.S.C. § 120 from, nonprovisional U.S. patent application Ser. No. 14/164,085 entitled "Providing Webpages Used To Configure Interactive Marketing Presentations Over A Network," filed Jan. 24, 2014. application Ser. No. 14/164,085 in turn claims the benefit under 35 U.S.C. § 119 of U.S. Provisional Application Ser. No. 61/757,060, entitled "Providing Webpages Used To Configure Interactive Marketing Presentations Over A Network," filed Jan. 25, 2013. The entire subject matter of the aforementioned patent documents is incorporated herein by reference.

TECHNICAL FIELD

The described embodiments relate to online advertising, and more particularly to providing interactive marketing presentations.

BACKGROUND INFORMATION

Client Relationship Management (CRM) systems provide a tool for sales associates of an organization to manage relations with clients. CRM systems are typically accessible through a web browser via a network, and allow a group of sales associates to store contact information of clients, keep track of interactions with clients, and manage marketing campaigns. Unfortunately, CRM systems do not have effective functionality for closely tracking each interaction of every sales associate. Determining successful marketing techniques that other sales associates can emulate is costly. In some cases, it may not be possible to determine the most effective marketing technique because a top sales associate may decide to keep their marketing techniques confidential in order to maintain their competitive edge within the organization. Third, an organization is usually unaware of how a potential client responds to the marketing pitch by a sales associate because the interaction between the sales associate and the contact typically ends when the communication ends. Thus the organization is generally forced to surmise the success of a marketing campaign from the overall number of closed deals. A more effective solution is desired.

SUMMARY

A software application running on a web server provides a webpage to an Internet browser of a selling entity. The selling entity is typically engaged in selling a product or service. The webpage includes an amount of instructions that render User Interface (UI) components on the browser of the selling entity. The selling entity uses the UI components to configure a marketing presentation. The marketing presentation is referred to as an "Interactive Marketing Presentation (IMP)" because the IMP receives user input that determines how the presentation is presented to the purchasing entity. For example, the purchasing entity determines the order that the segments of the marketing presentation are to be presented to the purchasing entity by clicking buttons on the IMP.

The selling entity configures the IMP using the UI components by generating segments to be part of the presentation. The selling entity configures each segment of the IMP to include rich-media content such as text, video, audio, and images. In one example, the selling entity creates an introductory segment and four response segments. The introduction segment is configured to include a video presentation and four buttons. The selling entity utilizes UI components to form links between the introductory segment and the response segments. The selling entity adds appropriate text, audio and video content to each of the four response segments.

In one embodiment, a selling entity accesses a login webpage via a network using an Internet browser executing on a user system. The user system is selected from the group consisting of a desktop computer, a portable laptop, or a mobile handset. The login page comprises a username input text field UI component, a password input text field UI component, and a submit button UI component. The selling entity enters username information and password information into their respective input text fields and clicks the login button. If the username information and password information is correct, then the selling entity is redirected to another webpage that includes a plurality of UI components used to configure the IMP. In another example, instead of the selling entity being redirected to another webpage, the selling entity is presented with the plurality of UI components used to configure the IMP on the same webpage without the selling entity being redirected to another webpage.

Next, the selling entity uses the plurality of UI components provided on the webpage to configure the IMP. A portion of the UI components present on the webpage are used to generate a visual representation of the IMP. The selling entity uses the UI components to generate segments of the presentation, also referred to as "nodes". The selling entity can add text, video, drawings, and navigation buttons to each segment, by clicking particular UI components or by dragging particular UI components. For example, the selling entity configures an IMP that includes an introduction segment that is used to introduce a product. The selling entity uses the UI components to label the introduction segment and to add video, text, pictures, and sound. The selling entity uses the UI components to add four clickable navigation buttons on the introduction segment, each clickable button corresponding to another segment of the IMP. When the IMP is rendered on an Internet browser, each of the navigation buttons will be rendered on the introduction segment and when clicked, will render a corresponding segment of the IMP. In this example, the IMP configured by the selling entity is represented as a tree having a root node and four child nodes.

Next, configuration information of the IMP created by the selling entity is communicated from the webpage to the software application running on the web server via the network. The configuration information comprises data for rendering the IMP on an Internet browser of a purchasing entity or other potential business customer. The configuration information includes all the content for each of the segments (text, URLs for videos, URLs for images, URLs for audio recordings) and also includes link information indicative of how the segments of IMP are associated with each other. The software application stores the configuration information in a database.

A purchasing entity may then view the interactive marketing presentation by visiting a web address provided by the selling entity. In response to receiving a particular HTTP request onto the web server, the software application retrieves the configuration information from the database. The software application uses the retrieved configuration information to generate a set of instructions that render the IMP. The software application supplies set of instructions that render the IMP onto the browser of the purchasing entity. The purchasing entity views and interacts with the IMP. In addition to providing the IMP to the purchasing entity, the software application stores interaction information generated from the purchasing entity interacting with the IMP. Interaction information includes values indicative of lengths of time the purchasing entity spends viewing each segment of the IMP. Interaction information also includes information indicative of which buttons and other UI elements were clicked on each of the segments. The interaction information generated as a result of the interaction is stored in the database and is provided to the selling entity.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

Reference will now be made in detail to some embodiments of the invention, examples of which are illustrated in the accompanying drawings.

DETAILED DESCRIPTION

Figure 1:
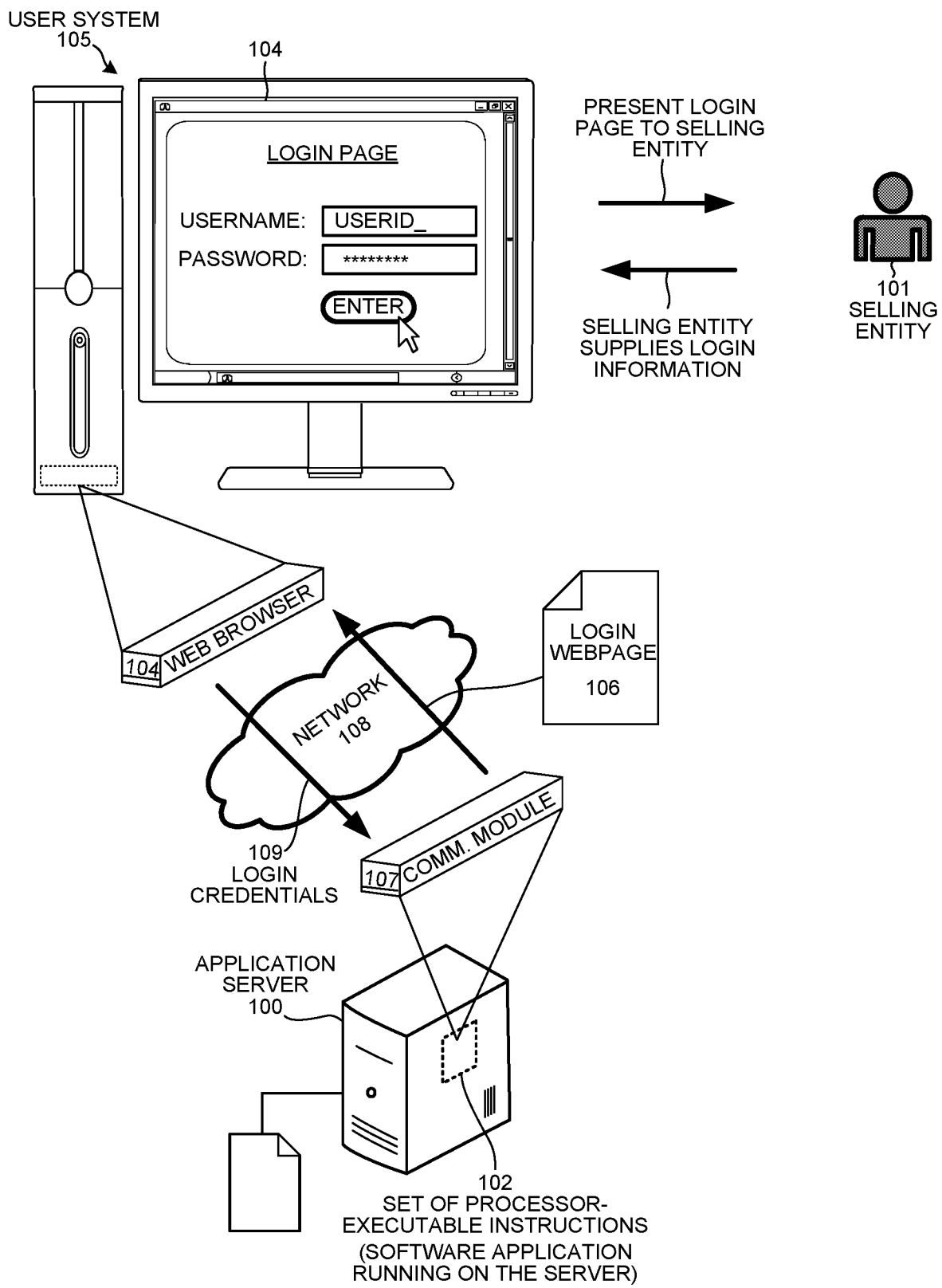
FIG. 1 is a diagram of a selling entity 101 logging into an application server 100 to generate an Interactive Marketing Presentation (IMP) to market a product to prospective clients.

FIG. 1 is a diagram of a selling entity 101 logging into an application server 100 to generate an Interactive Marketing Presentation (IMP) to market a product to prospective clients. In this example, selling entity 101 is a sales associate employed by a company that provides the product being marketed. A set of processor-executable instructions 102 are stored on application server 100. The set of processor-executable instructions is a software application. The application server 100 receives HyperText Transfer Protocol (HTTP) requests and responds to the request by supplying HyperText Markup Language (HTML) instructions executable on an Internet browser.

Selling entity 101 supplies a Universal Resource Locator (URL) address of the application server 100 to Internet browser 104 of user system 105. Internet browser 104 generates and transmits an HTTP request to application server 100. HTTP request is handled by the software application 102, and the software application 102 responds by transmitting an HTTP response comprising instructions for rendering an HTML login page 106 via communication module 107 over network 108. Login page 106 queries the selling entity 101 for login credentials. Selling entity 101 provides the login credentials, and the login credentials 109 are communicated back to application server 100 for authentication. After authenticating, selling entity 101 obtains access to the software application 102.

Figure 2:
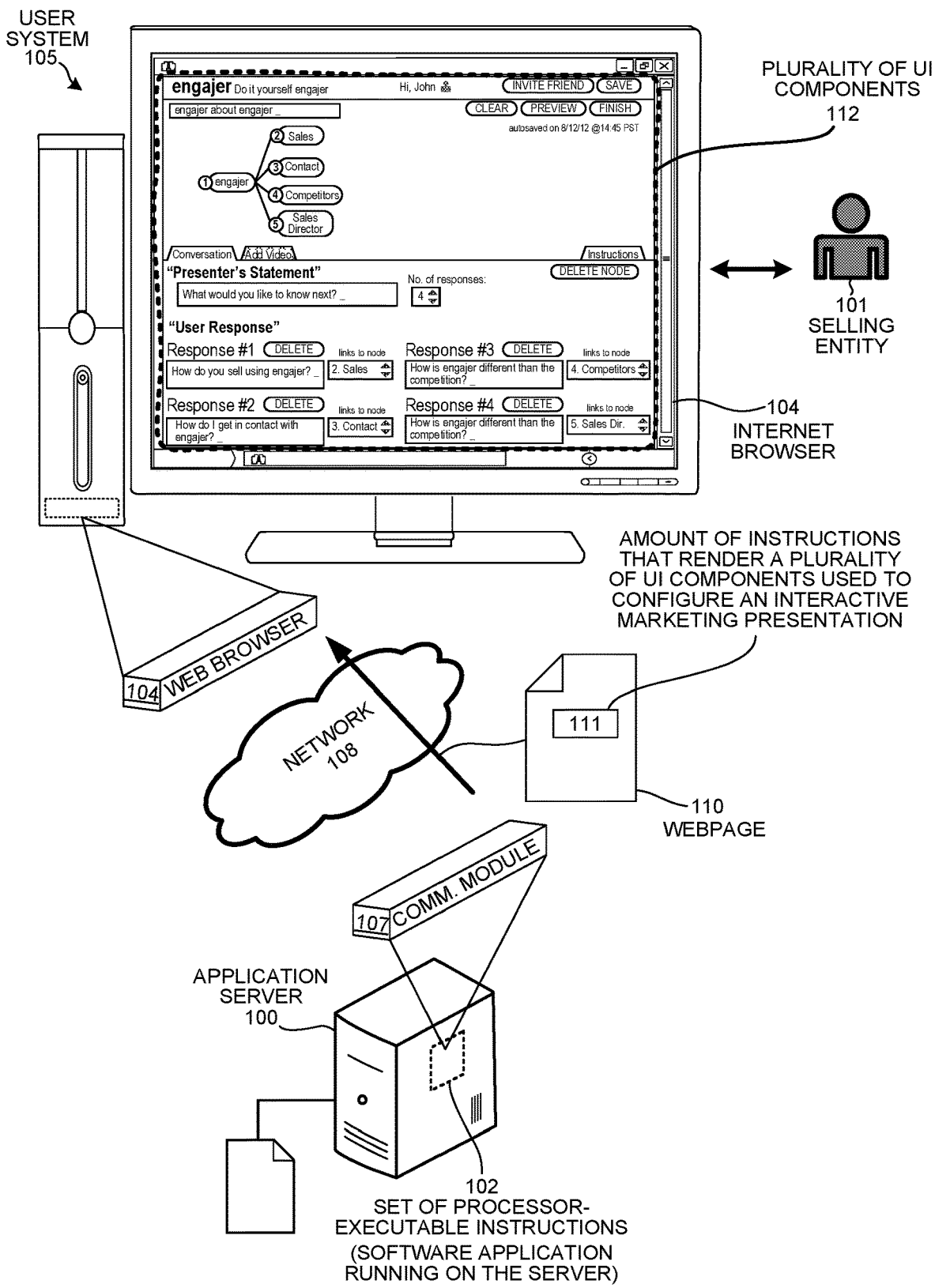
FIG. 2 is a diagram of the software application 102 providing to the selling entity a webpage 110 used to configure the IMP.

FIG. 2 is a diagram of a webpage 110 rendered on Internet browser 104 that is used to configure the IMP. Software application 102 generates and supplies webpage 110 to Internet browser 104 via communication module 107 and network 108. Webpage 110 includes an amount of instructions 111. The amount of instructions 111 cause browser 104 to render a plurality of User Interface (UI) components 112. The selling entity 101 uses the UI components to configure the IMP. In this example, the amount of instructions 111 includes HyperText Markup Language (HTML) instructions that include various HTML elements, such as a span element, an image element, a table element, an animation element, an external video object element, a poll element, a selection box element, a radio box element, a form element, a text box element, a real-time messaging box element, and a button element.

Figure 3:
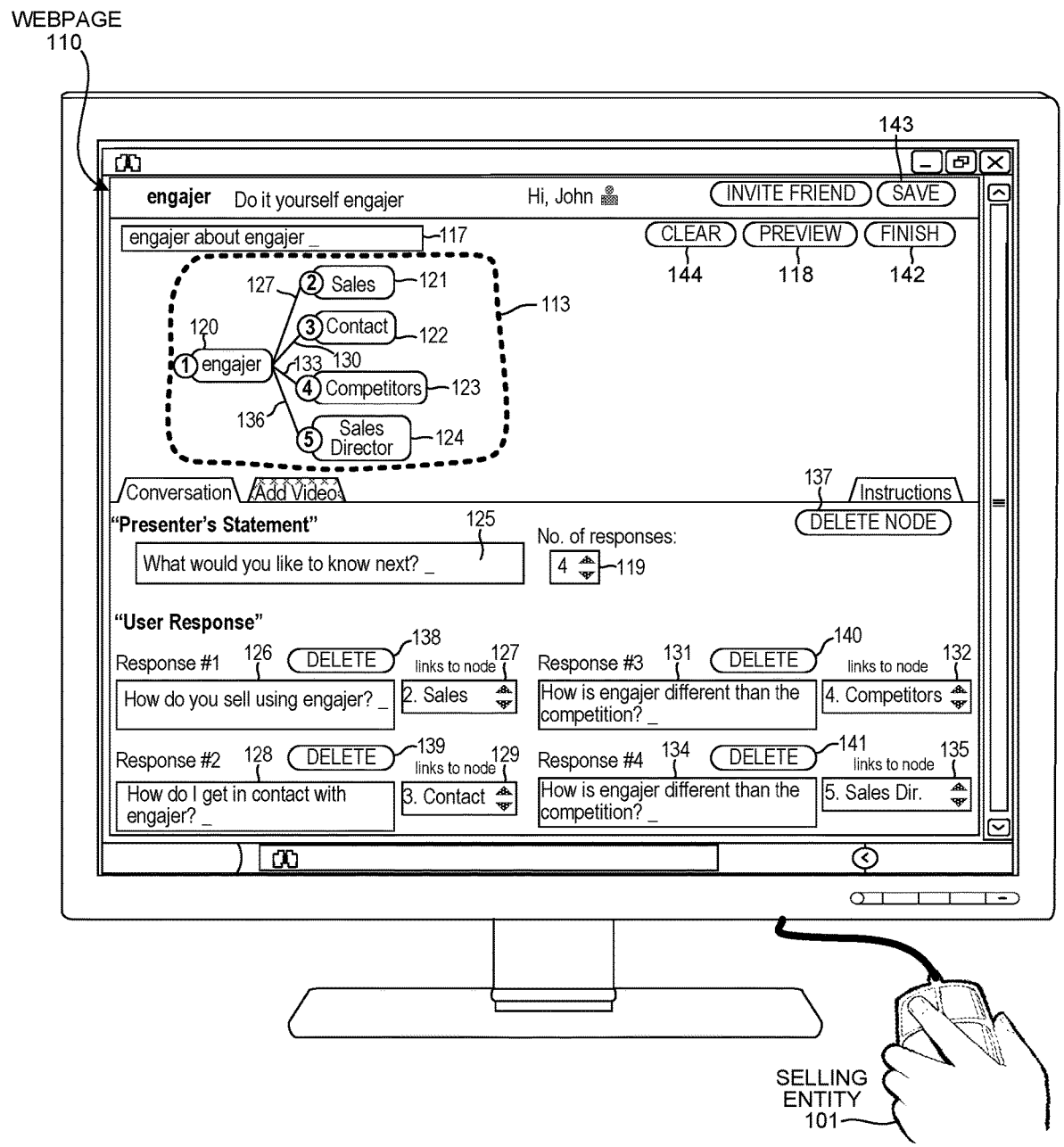
FIG. 3 is a diagram of the selling entity 101 using the UI components 112 to configure the IMP 113.

FIG. 3 is a diagram of the selling entity 101 using the UI components 112 to configure the IMP. Reference numeral 113 identifies a plurality of UI components that represent the IMP. Blocks 120-124 represent segments of the IMP that are configured by the selling entity 101. Each of blocks 120-124 is also referred to as a "segment" or a "node". Text associated with the IMP that is to be configured is set using text box UI component 117. The text that is supplied to text box 117 serves as a label or title for the IMP. In this example, selling entity 101 supplies text "engajer about engajer" into the text box 117.

Although FIG. 3 illustrates segments 120-124, initially, the selling entity 101 is presented with a webpage without any segments. The set of UI components 113 that is shown in FIG. 3 is merely a visual representation of the IMP that is used by the selling entity 101 as a visual tool to design the presentation. In implementation, IMP is a set of instructions that is used to render the 113 on the Internet browser. The IMP as it will appear on the Internet browser of a purchasing entity may be previewed by the selling entity by clicking UI button element 118. Below is a description of how the selling entity 101 generates the IMP via the UI components provided on webpage 110.

Initially, selling entity 101 begins by generating a first segment 120 and entering text to be associated with the segment 120 ("engajer"). UI component 125 is an HTML text field. Selling entity 101 enters text into text field 125, for example, "What would you like to know next?". The first segment 120 of the IMP will display this text when the IMP is rendered. The number of segments to be associated with segment 120 is set using drop-down list UI component 119. For example, the selling entity 101 sets drop-down list to "4" indicating that the viewer of the IMP 113 will be able to select from one of four buttons to view additional segments of the presentation.

Next, selling entity uses the plurality of UI components 112 (see FIG. 2) to configure the IMP to include segments 121-124. Each of segments 121-124 are configured similarly to segment 120 using the UI components 112 to include rich-media content, such as audio, video, text and images. Although FIG. 3 does not show the creation of each segment, below is an explanation of how the user would have used the UI components on webpage 110 to generate and configure the plurality of segments 113. In this example, the selling entity 101 clicks on the segment 121 and enters text ("Sales") into the text box 125 to set the text of the segment 121. Selling entity 101 clicks on the segment 122 and enters text ("Contact") into the text box 125 to set the text of the segment 122. Selling entity 101 clicks on the segment 123 and enters text ("Competitors") into the text box 125 to set the text of the segment 123. Selling entity 101 clicks on the segment 124 and enters text ("Sales Director") into the text box 125 to set the text of the segment 124.

Next, selling entity uses the UI components 112 to form links between segment 120 and segments 121-124. Selling entity 101 clicks on segment 120, and enters text into text box 126 ("How do you sell using engajer?"). This text will be associated with a clickable button (see button 158 in FIG. 6) when segment 120 is rendered in the Internet browser. Selling entity 101 forms the link by selecting the segment 121 ("2. Sales") from the drop-down list UI element 127. This link is shown on the webpage as link 127 connecting segment 120 and segment 121.

Selling entity sets the associated text and link for each of the other three segments 122-124 in a similar fashion. Selling entity 101 enters text into text box 128 ("How do I get in contact with engajer?"). This text will be associated with a clickable button (see button 159 in FIG. 6) when segment 120 is rendered in the Internet browser. Selling entity 101 forms the link by selecting the segment 122 ("3. Contact") from the drop-down list UI element 129. This link is shown on the webpage as link 130 connecting segment 120 and segment 122.

Selling entity 101 enters text into text box 131 ("How is engajer different than the competition?"). This text will be associated with a clickable button (see button 160 in FIG. 6) when segment 120 is rendered in the Internet browser. Selling entity 101 forms the link by selecting the segment 123 ("4. Competitors") from the drop-down list UI element 132. This link is shown on the webpage as link 133 connecting segment 120 and segment 123.

Selling entity 101 enters text into text box 134 ("What benefits as a sales director do I receive from engajer?"). This text will be associated with a clickable button (see button 161 in FIG. 6) when segment 120 is rendered in the Internet browser. Selling entity 101 forms the link by selecting the segment 124 ("5. Sales Director") from the drop-down list UI element 135. This link is shown on the webpage as link 136 connecting segment 120 and segment 124.

Selling entity 101 is able to use UI components 112 to delete segments of the IMP 113 and links between the segments. For example, if selling entity 101 decides to delete segment 124, then selling entity 101 selects segment 124 by clicking on segment 124 and clicks the UI element button 137 labeled "Delete Node". Additionally, the selling entity 101 is able to delete links and their associated text by using the UI button elements 138-141 that are labeled "Delete". For example, selling entity 101 may delete the link 136 by selecting segment 120 and clicking delete button 141. As a result of deleting segment 120, the IMP configuration information is updated to reflect such deletion of link 136.

After the selling entity 101 has configured the IMP 113, then selling entity 101 submits the configured IMP 113 to the software application 102 by clicking the UI button component 142 labeled "Finish". In response to clicking button 142, the webpage 110 communicates the configuration information of the IMP 113 to the software application 102 running on the application server 100. The configuration information comprises all the information necessary to render the IMP 113 on an Internet browser. Configuration information includes all the content for each of the segments (text, URLs for videos, URLs for images, URLs for audio recordings) and also includes link information indicative of how the segments are associated with each other. If selling entity 101 desires to preview the IMP prior to transmitting to the server 100, then selling entity 101 may click the preview button 118 to view how the IMP will be presented to a purchasing entity or other potential business contact. Selling entity 101 may save the IMP by clicking the UI button component 143 labeled "Save" so that the selling entity 101 may login later to modify and complete the IMP. Additionally, selling entity 101 may delete the IMP by clicking the UI button component 144 labeled "Clear" so that the selling entity 101 may configure a new presentation.

Figure 4:
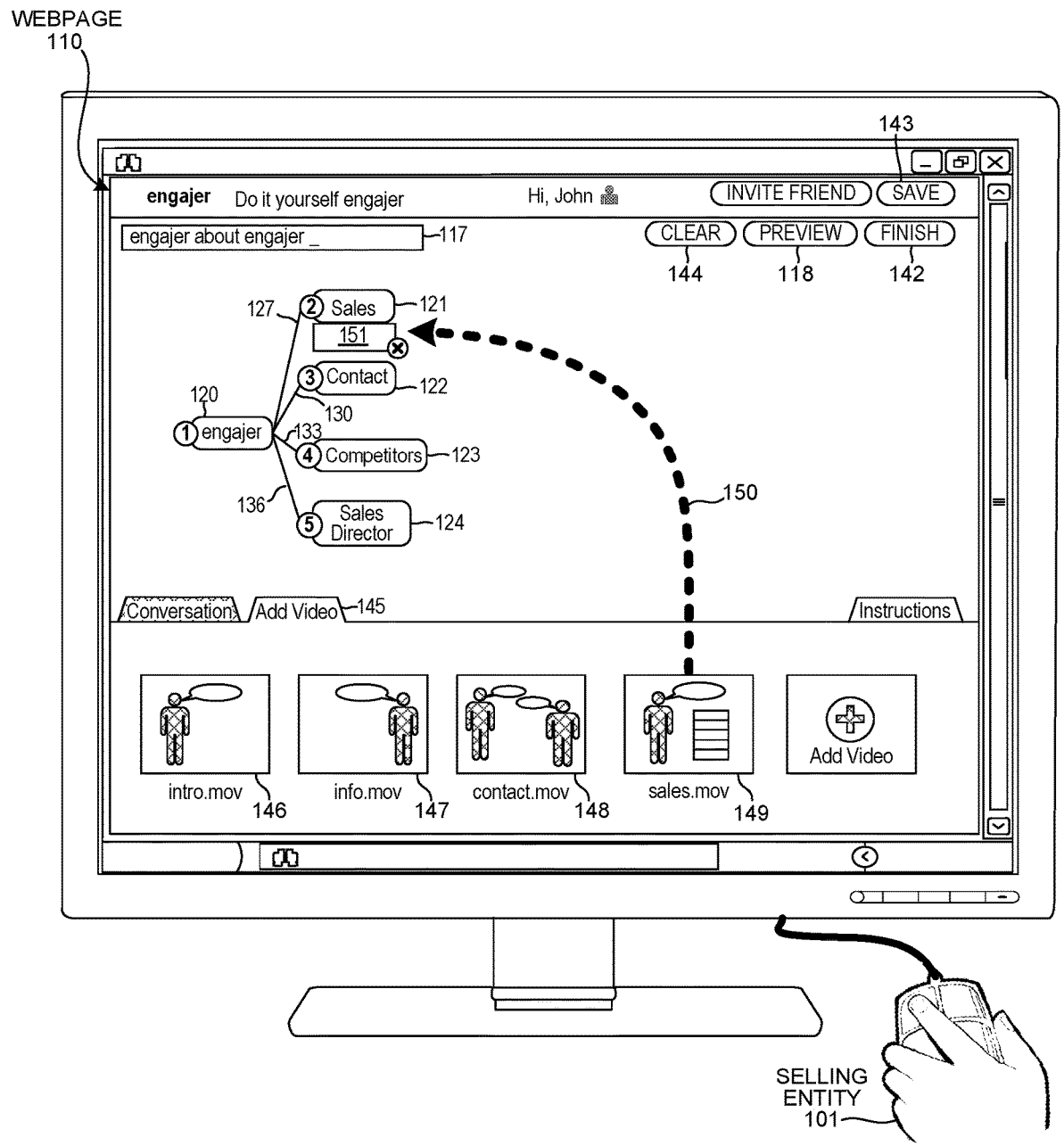
FIG. 4 is a diagram showing how selling entity 101 uses the UI components 112 to configure the IMP 113 such that video is associated with each of the segments of the IMP 113.

FIG. 4 is a diagram showing how selling entity 101 uses the UI components 112 to configure the IMP 113 such that video is associated with each of the segments of the IMP 113. Selling entity 101 incorporates video to the presentation by clicking the UI tab component 145 labeled "Add Video". The UI components 113 provide a drag-and-drop feature such that the selling entity 101 selects a video and drag-and-drops the video onto the segment the selling entity 101 wants to associate with the video. For example, selling entity selects video 149 and drag-and-drops the video 149 onto segment 121. Reference numeral 150 identifies a dashed line and arrow that represents the selling entity 101 performing this drag-and-drop operation using the UI components provided on webpage 110. Reference numeral 151 identifies a UI block component that is provided to the selling entity as a visual tool to indicate that video 148 is associated with segment 121. When a purchasing entity or other business contact is presented with segment 121, the purchasing entity will be presented with video 148.

Selling entity 101 is presented with various videos 146-149 that the selling entity 101 may incorporate in the presentation. The videos 146-149 shown in FIG. 4 are made available to selling entity 101 in a variety of ways. For example, the videos may be uploaded from a storage device of the user system 105 to the application server 100 by the selling entity 101. In another example, selling entity 101 provides a URL associated with a video to the software application 102, for example a link to a "YouTube" video. In yet another example, selling entity 101 records the video on Internet browser 104 via a digital video recorder attached to the user system 105, and webpage 110 transmits the recorded video to the software application 102 running on server 100.

Figure 5:
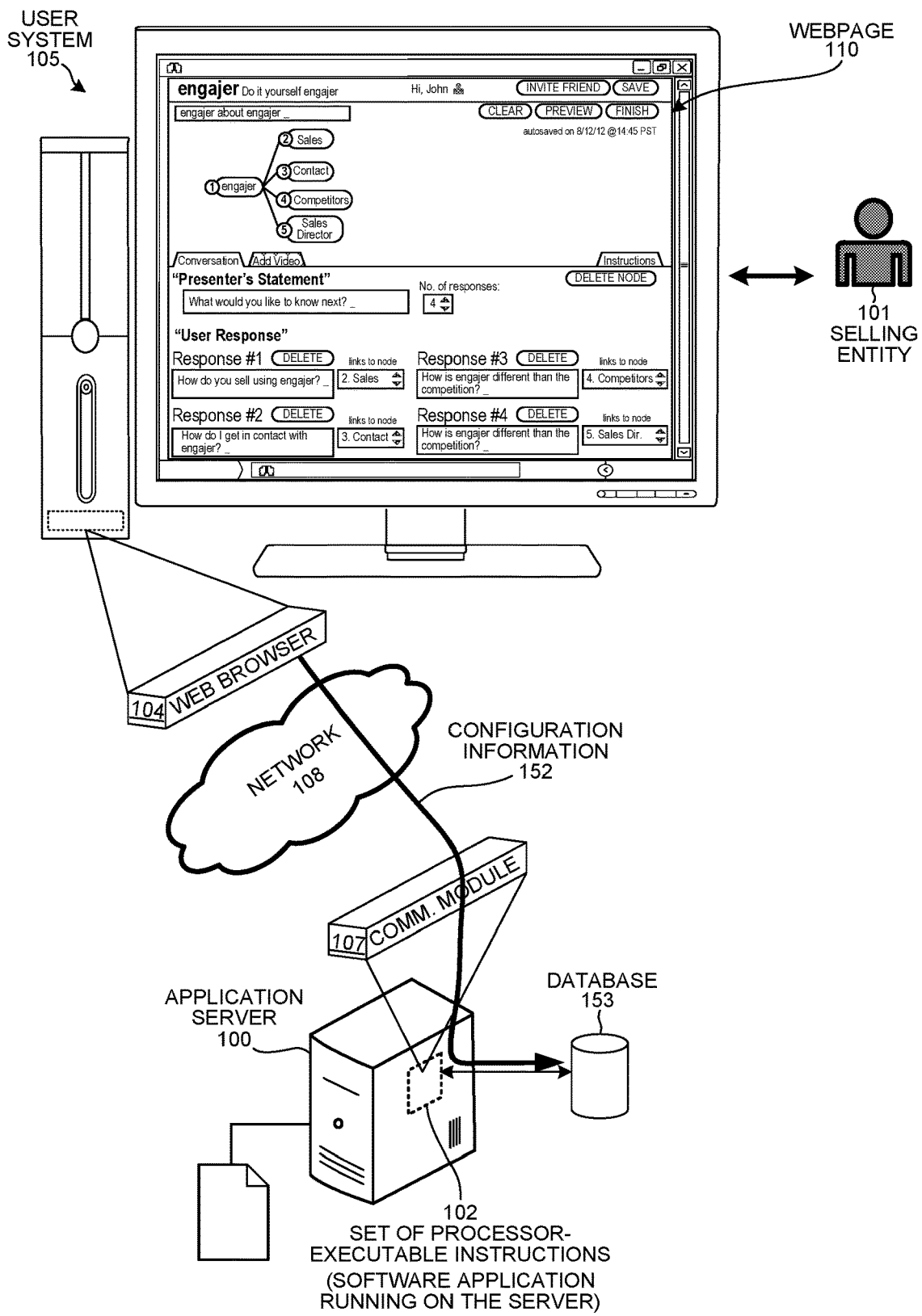
FIG. 5 is a diagram showing the webpage 110 transmitting configuration information 152 to the software application 102 running on application server 100.

FIG. 5 is a diagram showing the webpage 110 transmitting configuration information 152 to the software application 102 running on application server 100. The configuration information 152 comprises data for rendering the IMP on an Internet browser. In this embodiment, the configuration information is realized as JavaScript Object Notation (JSON) data. The configuration information 152 includes all the content for each of the segments (text, URLs for videos, URLs for images, URLs for audio recordings) and also includes link information indicative of how the segments of the IMP are associated with each other. After software application 102 receives the configuration information 152, software application 102 stores the configuration information 152 in a database 153. Database 153 may be part of application server 100, or may be located remotely on a different server.

The webpage 110 transmits the configuration information 152 to the application server 100 in a variety of different ways. In this embodiment, the webpage 110 comprises JavaScript instructions. The JavaScript instructions may be hardcoded in the webpage 110 or may be linked in the webpage 110 to a javascript file stored on application server 100 or an external server. JavaScript instructions include a function that is binded to the "Finish" button 142 such that when selling entity clicks the "Finish" button 142, the function is called and a resulting HyperText Transfer Protocol (HTTP) POST request is generated and supplied over network 108 to the software application 102 running on application server 100. Software application 102 is configured to detect such an HTTP POST request and determines that the HTTP POST request includes configuration information of the IMP that is then stored.

In another embodiment, the webpage 110 comprises JavaScript instructions for performing an Asynchronous JavaScript and XML (AJAX) request. The JavaScript instructions may be hardcoded in the webpage 110 or may be linked in the webpage 110 to a javascript file stored on application server 100 or an external server. The JavaScript instructions perform the AJAX request by generating an XMLHttpRequest object that is supplied over network 108 to the software application 102 running on application server 100. Software application 102 is configured to detect such an XMLHttpRequest object and determines that the XMLHttpRequest object includes configuration information of the IMP that is then stored. The AJAX request is performed periodically such that the webpage 110 does not appear to refresh or redirect to another page. In this fashion, the webpage 110 essentially performs auto-save without the user being aware that the presentation is being saved. Upon clicking "Finish" button 142, another request is generated indicating to software application 102 that the presentation is complete.

In yet another embodiment, the webpage 110 comprises JavaScript instructions for maintaining a web socket connection with the software application 102 running on application server 100. The Javascript instructions use the WebSocket protocol to communicate the configuration information 152 to the application server 100.

Figure 6:
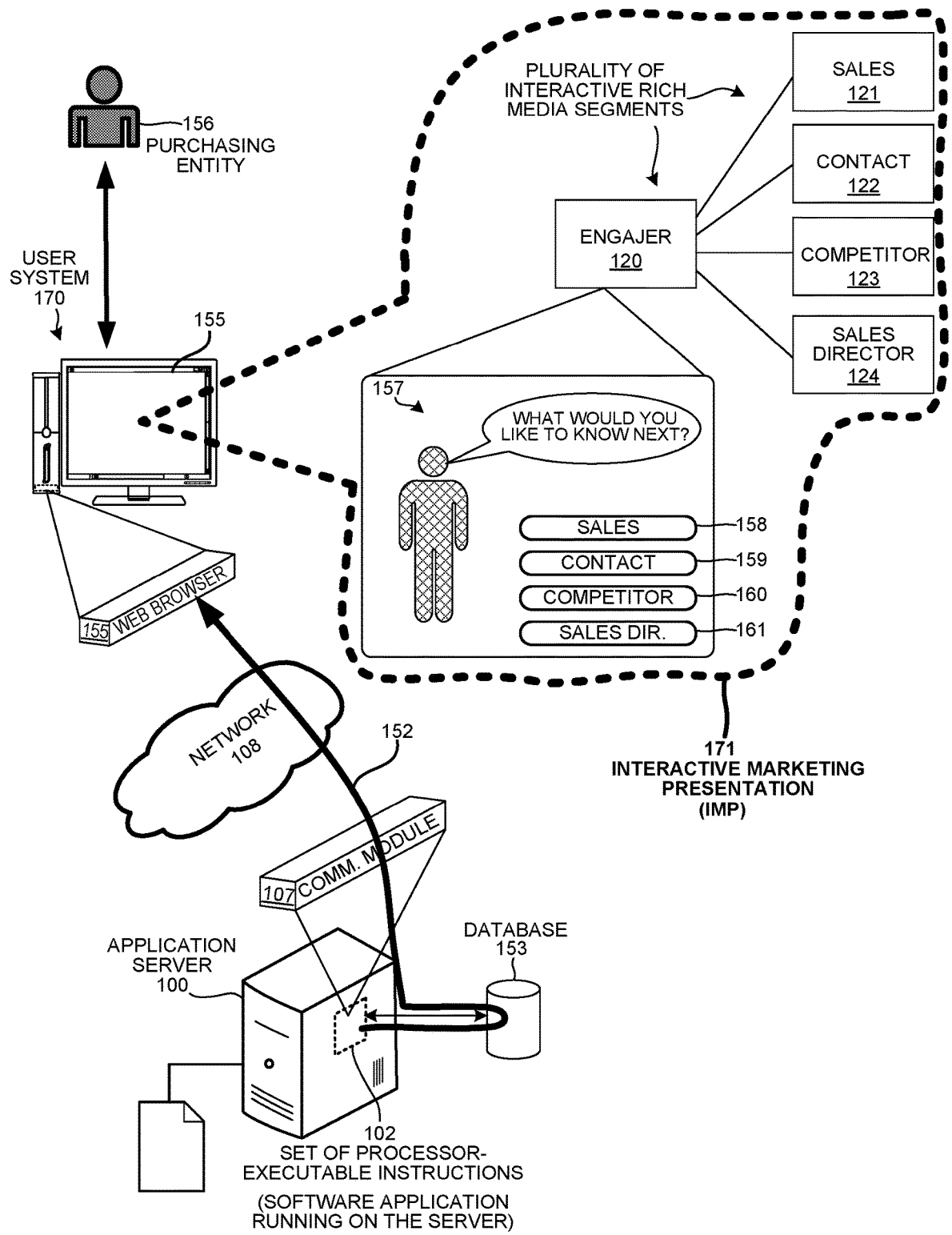
FIG. 6 is a diagram showing how the software application 102 retrieves the configuration information 152 and transmits the configuration information 152 to an Internet browser 155 of a purchasing entity 156.

FIG. 6 is a diagram showing how the software application 102 retrieves the configuration information 152 and transmits the configuration information 152 to an Internet browser 155 of a purchasing entity 156. The internet browser 155 is running on a user system 170 of the purchasing entity 156. The purchasing entity 156 is typically a potential purchaser or customer of the selling entity 101. The purchasing entity 156 views the IMP 171 on browser 155. Although IMP 171 is shown in FIG. 6 as a tree with 5 nodes, in reality IMP 171 is an interactive presentation that markets a product or a service being sold by the selling entity 101. The purchasing entity 156 is first presented with segment 120 labeled "Engajer". This involves the video 157 and buttons 158-161 being rendered on Internet browser 155. After the purchasing entity 156 views the IMP 171, the purchasing entity 156 clicks on any of buttons 158-161 to learn additional information regarding the product or the service. If the purchasing entity 156 clicks on button 158, then the contents of segment 121 will be rendered on browser 155. In this fashion, purchasing entity interacts and views the IMP 171.

Figure 7:
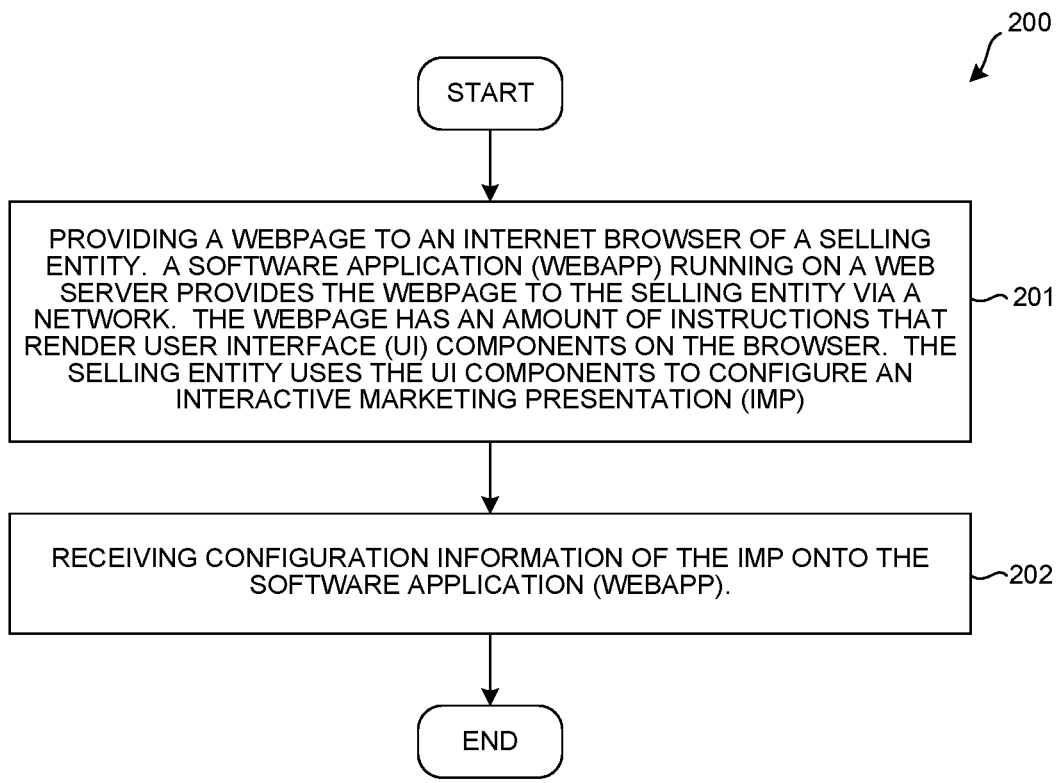
FIG. 7 is a flowchart of a method 200 in accordance with one novel aspect.

FIG. 7 is a flowchart of a method 200 in accordance with one novel aspect. In a first step (step 201), a webpage is provided to an internet browser of a selling entity. The webpage is provided by a software application (webapp) running on a web server over a network. The webpage has an amount of instructions that render User Interface (UI) components on the browser. The selling entity uses the UI components to configure an Interactive Marketing Presentation (IMP). For example, in FIG. 2, webpage 110 is provided to the browser 104. Webpage 110 includes an amount of instructions 111 that render UI components 112 on the browser 104. Selling entity 101 uses the UI components 112 to configure the IMP.

In a second step (step 202), configuration information of the IMP is received onto the software application (webapp) running on the web server. For example, in FIG. 5, webpage 110 supplies configuration information 152 to software application 102 running on server 100. Software application 102 stores the configuration information 152 in the database 153. Upon receiving a particular HTTP request, the software application 102 retrieves the configuration information 152 and uses the configuration information 152 to generate an HTTP response that includes instructions for rendering the IMP on an Internet browser.

Although certain specific exemplary embodiments are described above in order to illustrate the invention, the invention is not limited to the specific embodiments. For example, in another embodiment the application server is accessible to both the selling entity and purchasing entities via a mobile device such as a laptop, a tablet computer, or a cellular phone. In yet another embodiment, the IMP 113 supports additional interactive functions such as receiving phone calls or text messages. For example, a purchasing entity that is interested clicks on an HTML button element on a segment of the IMP 113 that in turn initiates a telephonic communication between the purchasing entity and the selling entity 101. The conversation between the sales associate and the selling entity 101 is recorded and transcribed and accessible by the sales team. Accordingly, various modifications, adaptations, and combinations of various features of the described embodiments can be practiced without departing from the scope of the invention as set forth in the claims.

What is claimed is:

1. A method comprising:
  (a) providing a webpage to an Internet browser of a selling entity, wherein a software application running on a web server provides the webpage to the Internet browser of the selling entity via a network, wherein the webpage includes an amount of instructions that render a plurality of User Interface (UI) components on the Internet browser of the selling entity, and wherein the plurality of UI components is used to configure an Interactive Marketing Presentation (IMP), wherein the UI components are used to generate a visual representation of the IMP that is displayed to the selling entity that shows how segments of the IMP are linked to each other, and wherein when the IMP is presented on a display to a user segments of the IMP are presented to the user in response to user input in accordance with how the segments are shown linked to each other in the visual representation of the IMP, wherein the visual representation of the IMP is not displayed to the user; and
  (b) receiving configuration information of the IMP onto the software application, wherein the webpage supplies the configuration information to the software application via the network.

2. The method of claim 1, further comprising:

(c) storing the configuration information received in (b) in a database, wherein the configuration information is retrievable by the software application to supply the IMP to an Internet browser of a purchasing entity, and wherein the configuration information is associated in the database with the selling entity.

3. The method of claim 1, wherein the plurality of UI components is used to configure the IMP by 1) generating a first segment of the IMP having a first content block, a first button, and a second button, 2) generating a second segment of the IMP having a second content block, 3) generating a third segment of the IMP having a third content block, 4) forming a first link between the first button and the second segment, and 5) forming a second link between the second button and the third segment.

4. The method of claim 3, wherein the first segment, the second segment, the third segment, the first link, and the second link are parts of the configuration information received by the software application in (b).

5. The method of claim 3, wherein the first content block, the second content block and the third content block include at least one element taken from the group consisting of: a video, an animation, a graph, a table, an image, and an audio clip.

6. The method of claim 1, wherein the plurality of UI components includes at least one element taken from the group consisting of: a span element, an image element, a table element, an animation element, an external video object element, a poll element, a selection box element, a radio box element, a form element, a text box element, a real-time messaging box element, and a button element.

7. The method of claim 1, wherein the configuration information received in (b) comprises a Uniform Resource Locator (URL) that corresponds to a video, wherein the URL is provided by the selling entity, and wherein the video is presented to a purchasing entity as part of a segment of the IMP.

8. The method of claim 1, wherein the IMP is a set of instructions that renders at least three rich-media content segments on a display of a device, wherein a first of the three rich-media content segments includes a first button and a second button, and wherein the plurality of segments is presented on the display such that if a purchasing entity presses the first button then a second of the three rich-media content segments is presented on the display whereas if the purchasing entity presses the second button then a third of the three rich-media content segments is presented on the display.

9. The method of claim 1, wherein the software application stores a first value indicative of a length of time the purchasing entity viewed the first of the three rich-media content segments, wherein the software application stores a second value indicative of whether the purchasing entity clicked the first button, and wherein the first value and second value are provided to the selling entity.

10. The method of claim 1, wherein the Internet browser of the selling entity is executing on a device of the selling entity, wherein the UI components are used by the selling entity using the device to configure the IMP, and wherein the device is selected from the group consisting of: a mobile handset, a portable computer and a desktop computer.

11. The method of claim 1, wherein the receiving of the configuration information in step (b) occurs in response to an asynchronous HyperText Transfer Protocol (HTTP) request.

12. The method of claim 1, wherein the receiving of the configuration information in (b) occurs in response to an HyperText Transfer Protocol (HTTP) request generated when the selling entity presses a button, wherein the button is one of the plurality of UI components.

13. The method of claim 1, wherein the receiving of the configuration information in (b) is a result of a web socket connection between the webpage provided to the Internet browser of the selling entity and the software application running on the web server.

14. A system comprising:

a database; and a software application running on a web server, wherein a browser executing on a computer of a user renders a document served up by the software application, the document includes an amount of instructions that render a plurality of User Interface (UI) components on the browser, wherein the plurality of UI components is used to configure an Interactive Marketing Presentation (IMP), wherein a visual representation of the IMP is displayed to a selling entity, wherein the visual representation of the IMP shows how segments of the IMP are linked to each other, wherein the visual representation of the IMP is not displayed to the user, wherein segments of the IMP are presented to the user in response to user input according to how the segments are linked to each other, and wherein the software application stores configuration information of the IMP in the database.

15. The system of claim 14, wherein the plurality of UI components includes at least one element taken from the group consisting of: a span element, an image element, a table element, an animation element, an external video object element, a poll element, a selection box element, a radio box element, a form element, a text box element, a real-time messaging box element, and a button element.

16. The system of claim 14, wherein the plurality of UI components rendered on the browser are used to configure the IMP by: 1) generating a first segment of the IMP having a first content block, a first button, and a second button, 2) generating a second segment of the IMP having a second content block, 3) generating a third segment of the IMP having a third content block, 4) forming a first link between the first button and the second segment, and 5) forming a second link between the second button and the third segment.

17. The system of claim 16, wherein the first segment, the second segment, the third segment, the first link, and the second link are parts of the configuration information stored in the database.

18. The system of claim 16, wherein the first content block, the second content block and the third content block include at least one element taken from the group consisting of: a video, an animation, a graph, a table, an image, and an audio clip.

19. A non-transitory computer-readable medium storing instructions that, when executed by a processor, cause the processor to perform a method, the method comprising:

(a) providing a webpage to an Internet browser of a selling entity via a network, wherein the webpage includes an amount of instructions that render a plurality of User Interface (UI) components on the Internet browser of the selling entity, wherein the plurality of UI components is used by the selling entity to configure an Interactive Marketing Presentation (IMP), wherein a visual representation of the IMP is displayed to the selling entity by the Internet browser of the selling entity, wherein the visual representation of the IMP shows how segments of the IMP are linked, and wherein, in response to user input of a user, segments of the IMP are presented to the user in accordance with how the segments are linked; and (b) receiving configuration information of the IMP, wherein the configuration information is received via the network.

20. The non-transitory computer-readable medium of claim 19, wherein the selling entity uses the plurality of UI components rendered on the Internet browser of the selling entity to configure the IMP by: 1) generating a first segment of the IMP having a first content block, a first button, and a second button, 2) generating a second segment of the IMP having a second content block, 3) generating a third segment of the IMP having a third content block, 4) forming a first link between the first button and the second segment, and 5) forming a second link between the second button and the third segment, and wherein the first content block, the second content block and the third content block include at least one element taken from the group consisting of: a video, an animation, a graph, a table, an image, and an audio clip.

21. The non-transitory computer-readable medium of claim 19, wherein the processor is a part of a web server, and wherein in the web server performs the providing of (a) and also performs the receiving of (b).

22. A method comprising:
(a) providing a webpage to an Internet browser of a selling entity, wherein a software application running on a web server provides the webpage to the Internet browser of the selling entity via a network, wherein the webpage includes an amount of instructions that render a plurality of User Interface (UI) components on the Internet browser of the selling entity, and wherein the plurality of UI components is used by the selling entity to configure an Interactive Marketing Presentation (IMP);

(b) causing a visual representation of the IMP to be displayed to the selling entity, wherein the visual representation of the IMP shows how segments of the IMP are linked to each other, wherein when the IMP is presented on a display to a user segments of the IMP are presented to the user in response to user input in accordance with how the segments are shown linked to each other in the visual representation, and wherein the visual representation of the IMP is not displayed to the user; and (c) receiving configuration information of the IMP onto the software application, wherein the configuration information is received via the network.

\* \* \* \* \*